United States Patent [19]
Taniuchi et al.

[11] 3,821,316
[45] June 28, 1974

[54] FLAME RETARDING HOLOGENATED COMPOUNDS

[75] Inventors: Akira Taniuchi, Kyoto; Takuji Nakano, Suita, both of Japan

[73] Assignee: Dai-Ichi Kogyo Seiyaku Co., Ltd., Kyoto, Japan

[22] Filed: Aug. 27, 1971

[21] Appl. No.: 175,692

Related U.S. Application Data

[60] Division of Ser. No. 19,068, March 12, 1970, Pat. No. 3,660,318, Continuation-in-part of Ser. No. 764,307, Oct. 1, 1968, abandoned.

[52] U.S. Cl............................................. 260/615 B
[51] Int. Cl...................................................... C07c 43/00
[58] Field of Search........................ 260/615 B, 615

[56] References Cited
UNITED STATES PATENTS

| | | | |
|---|---|---|---|
| 3,252,922 | 5/1962 | Degener et al. | 260/615 B X |
| 3,419,532 | 12/1968 | Jackson | 260/615 B X |
| 3,419,621 | 12/1968 | Davis et al. | 260/615 B |
| 3,474,148 | 10/1969 | Carpenter et al. | 260/615 R |
| 3,674,902 | 7/1972 | Kalopissis et al. | 260/615 B |

FOREIGN PATENTS OR APPLICATIONS

| | | | |
|---|---|---|---|
| 997,255 | 7/1965 | Great Britain | 260/615 R |

*Primary Examiner*—Howard T. Mars
*Attorney, Agent, or Firm*—Cushman, Darby and Cushman

[57] ABSTRACT

Novel halogenides of a reaction product of a phenol, alcohol, fatty acid, thiophenol or mercaptane with a glycidyl ether, glycidyl ester or glycidyl thioether and, if necessary, an alkylene oxide or alkylene sulfide are excellent flame-retarding agents for polystyrene and a polystyrene composition containing said halogenated compound is self-extinguishable and resistant to weather and discoloration with lapse of time.

6 Claims, No Drawings

FLAME RETARDING HOLOGENATED COMPOUNDS

CROSS-REFERENCE TO RELATED APPLICATION

This application is a division of application Ser. No., 19,068; filed Mar. 12, 1970 now U.S. Pat. No. 3,660,318 which in turn is a continuation-in-part of application Ser. No., 764,307 filed Oct. 1, 1968, now abandoned.

The present invention relates to a novel halogenated compound which is a flame-retarding agent for polystyrene and an anti-flame polystyrene composition containing the same. More particularly, the present invention relates to a halogenide of a reaction product of a phenol, alcohol, fatty acid, thiophenol or mercaptane with a glycidyl ether, glycidyl ester or glycidyl thioether and, if necessary, an alkylene oxide or alkylene sulfide, and to composition of polystyrene and said halogenated compound as a flame-retarding agent.

With recent rapid development of industry, organic synthetic high polymers have become applied to many uses, such as decorations, building materials, daily necessaries, constructions, buildings and heat-insulating materials in industry. Polystyrene is excellent in transparency, electric properties and thermoplasticity, and hence has often and much been used in the above-mentioned various fields.

However, in general, organic synthetic high polymers are combustible, and hence, once it is burnt, various fatal dangers are encountered. Recently it has been desired that polystyrene have not only such excellent properties but also be non-combustible, and research on various anti-flame polystyrene has been done. For example, halogenated hydrocarbons, such as 1,1,2,2-tetrabromoethane, 1,2-dichloro-1,2,3,4-tetrachloroethane, 1,2-dibromoethane (Japanese Pat. Publication No. 5,739/62), 2-chloro-1,2,3,4-tetrabromobutane (Japanese Patent Publication No. 20,216/66) and the like, haloalkyl phosphates, such as tris-(2,3-dibromopropyl) phosphate (Japanese Pat. Publication No. 6,788/58) and the like and acetals or ethers of 2,3-dibromopropanol-1 (Japanese Pat. Publication No. 7,089/60) are known as flame-retarding agents for polystyrene.

However, many of them are not applicable in practice, because some must be used in a large amount, some have low weather-resistance and hence cause discoloration and deterioration of articles containing the same with the lapse of time, and some are expensive. Further, when some of the known flame-retarding agents are incorporated into polystyrene, the softening point of the resulting uniform composition becomes lower than that of polystyrene itself, and some flame-retarding agents, when mixed with polystyrene and subjected to foaming, produce only a foam having a low degree of expansion which is a fatal defect for polystyrene foam. Some other flame-retarding agents have low boiling points and hence are volatile, and polystyrene rendered anti-flame by treating it with such flame-retarding agent is, therefore, returned to the original combustible state with the lapse of time because the flame-retarding agents are volatilized with the lapse of time. Such a polystyrene composition is difficult to have permanent anti-flame property.

An object of the present invention is to provide a novel halogenated compound which can impart anti-flame properties to polystyrene without impairing the physical properties of polystyrene itself and which has no abovementioned defects.

Another object of the present invention is to provide an anti-flame polystyrene composition containing a novel, flame-retarding, halogenated compound.

A further object of the present invention is to provide an anti-flame, foamed polystyrene composition containing a novel flame-retarding, halogenated compound.

A still further object of the present invention is to provide a foamed polystyrene composition containing a novel flame-retarding, halogenated compound and having not only anti-flame property, but also high resistance to weather and blocking.

Other objects and advantages of the present invention will be apparent from the following description.

In accordance with the present invention, the novel halogenated compound has the following formula:

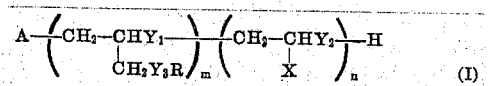
(I)

wherein A is an alkoxy group having one to five carbon atoms, an alkylthio group having one to five carbon atoms, a carboxylic acid residue having one to five carbon atoms, a phenoxy group or a phenylthio group or a halogenide of said groups; R is a halogenated alkyl group having one to five carbon atoms or a halogenated acyl group having one to five carbon atoms; X is an alkyl group having one to two carbon atoms, a phenyl group, a halogenide of these groups or a hydrogen atom; $Y_1$, $Y_2$ and $Y_3$ are oxygen or sulfur; $m + n = 1 - 100$; $m \geq 1$; and $n \geq 0$. The said compound is a very effective flame-retarding agent for polystyrene. In view of simplicity of production, compounds having the formula:

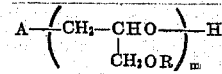

wherein A, R and m are the same as defined above are preferable. m can be 2 to 100.

The group represented by A includes, for example, methoxy, ethoxy, propoxy, amploxy, monochloroethoxy, monobromoethoxy, dichloropropoxy, dibromopropoxy, methylthio, ethylthio, propylthio, monochloroethylthio, monobromoethylthio, dichloropropylthio, dibromopropylthio, acetoxy, monochloroacetoxy, monobromoacetoxy, tribromoacetoxy, tribromoethoxy, tribromopropoxy, phenoxy, monochlorophenoxy, monobromophenoxy, trichlorophenoxy, tribromophenoxy, pentachlorophenoxy, phenylthio, monochlorophenylthio, tribromophenylthio and the like. The group represented by R includes, for example, dichloropropyl, dibromopropyl, dichlorobutyl, dibromobutyl, tribromoethyl, tribromopropyl, dichloropentyl, dibromopentyl, monochlorodibromobutyl, dichloropropionyl, dibromopropionyl, dichloroisobutyryl, dibromoisobutyryl, monochlorodibromopropionyl and the like. The group represented by X includes, for example, methyl, ethyl, monochloromethylene, monobromoethylene, phenyl, monochlorophenyl, tribromophenyl and the like and hydrogen.

The present novel halogenated compound can be prepared by reacting a phenol, alcohol, fatty acid, thiophenol or mercaptane or a halogenide thereof with a glycidyl ether, glycidyl ester or glycidyl thioether or a halogenide thereof and, if necessary, an alkylene oxide or alkylene sulfide or a halogenide thereof and then halogenating the resulting product or by first halogenating the above-mentioned reactants and then reacting the halogenated reactants.

The compound containing at least one tri-halogenated propyl group can be prepared by first dehydrohalogenating the corresponding compound containing at least one di-halogenated propyl group and then halogenating the thus dehydrohalogenated compound.

The present flame-retarding compound is represented by the formula (I), in which the two segments

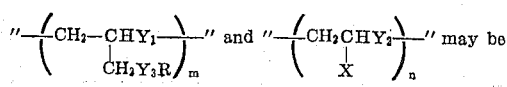

block-copolymeric or random-copolymeric and may be exchanged with each other.

The present invention further provides an anti-flame composition containing a polystyrene and a flame-retarding compound having the formula (I). The term "polystyrene" used herein refers to homopolymer of styrene and copolymers of at least 50 percent by weight of styrene and other unsaturated compounds, such as acrylonitrile, vinyl carbazole, acrylates, methacrylates, vinyl esters, butadiene and the like. The term "styrene" used herein includes not only styrene per se but also derivatives thereof, such as α-methyl styrene. The present polystyrene composition may be in the form of a foam or non-foam.

The addition of the present flame-retarding compound to a polystyrene may be effected before or after polymerization of styrene, and in other words, at any time until the final molding of polystyrene. The present flame-retarding compound may be added in an amount of 1 to 20 parts by weight per 100 parts by weight of polystyrene.

In accordance with an embodiment of the present invention, an anti-flame non-foamed polystyrene sheet can be prepared by kneading a polystyrene and a flame-retarding agent on a pair of hot rollers at a temperature of 140° to 150°C until the flame-retarding agent is uniformly mixed with the polystyrene and then pressing the resulting mixture with a hot press for several minutes to form a sheet. In accordance with another embodiment of the present invention, an anti-flame, foamed polystyrene can be prepared by heating polystyrene particles containing the present flame-retarding agent and propane gas by means of hot water or steam at 100°C to pre-expand the particles, allowing the pre-expanded particles to stand at room temperature for 5 hours or more, and then heating the particles in a mold by means of a super-heated steam at 1 atm. for about 90 seconds to form a foamed polystyrene. The flame-retarding agent may be added to styrene before polymerization, or to polystyrene particles before or after pre-expansion, though it is particularly preferable to add the flame-retarding agent to polystyrene particles before pre-expansion.

The flame-retarding compound of the present invention increases in viscosity and boiling point with the increase of the degree of polymerization, $m + n$. Further, as shown in the Examples which will be described hereinafter, the flame-retarding property and weather-resistance of the present compound are enhanced with the increase of the degree of polymerization. Moreover, the resistance to blocking of pre-expanded polystyrene particles is also enhanced with the increase of the degree of polymerization. The term "blocking" used above refers to the phenomenon that when foaming agent-containing polystyrene particles are pre-expanded, a part of the surface of the particles is melted, whereby the particles stick to one another to form lumps. In the production of a foamed polystyrene, pre-expansion is required prior to final expansion in a mold, and hence, if blocking is caused in the pre-expansion, the final expansion in a mold becomes difficult.

Since the lower the degree of polymerization, $m + n$, the lower the boiling point of the compound and hence the easier the volatilization of the compound, and since super-heated and pressure steam is used in foaming polystyrene, a low boiling compound is easily steam-distilled off and hence, the anti-flame property of a polystyrene foam containing the compound is lowered. Further, when $m + n$ is low, the resistance to weather and blocking is lowered as is clear from the Examples which will be described hereinafter. On the other hand, when a flame-retarding agent is applied to the surface of polystyrene particles, the lower the viscosity of the compound, the more uniform the resulting coating. In accordance with the inventors' research, the range of the degree of polymerization, $m + n$, of 1 to 100 is suitable for the purpose of the present invention. However, a compound having the formula (I) in which $m$ is one, $n$ is zero and sulfur atom is not present in the molecule, is substantially the same is flame-retarding effect as the other compound, but tends to cause blocking as compared with the others. Therefore, the range of the degree of polymerization, $m$, of 2 to 100 is especially suitable for the purpose of the present invention, When the present flame-retarding compound has the formula (I) in which n is zero and sulfur atom is not present in the molecule.

In these flame-retarding compounds of the present invention, the compound containing at least one tri-halogenated propyl group is more useful than the corresponding compound containing at least one di-halogenated propyl group when added in the same proportion to the polystyrene. Since the boiling point of the compound containing at least one tri-halogenated propyl group is higher than that of the corresponding compound containing at least one di-halogenated propyl group, the former is more stable than the latter in the process for the production of the foamed-polystyrene. The present flame-retarding compound containing at least one tri-halogenated propyl group may be added in an amount of 0.5 or more parts by weight per 100 parts by weight of polystyrene.

The present flame-retarding compound may be used together with a halogenated hydrocarbon, a halogen-containing alkyl phosphate or phosphite, a metal oxide, an anti-oxidant and a stabilizer, such as di(butyl)tin dilaurate and di(butyl)tin maleate.

The present halogenated compound can be prepared as follows:

METHOD 1

Into a four-necked flask equipped with a stirrer, a thermometer, a dropping funnel and a reflux condenser were charged 32 parts by weight of methanol and 0.5 part of a $BF_3$—$Et_2O$ catalyst, into which 228 parts by weight of allyl glycidyl ether was dropped through the dropping funnel with stirring at a temperature between 40°C and 50°C. Stirring was thereafter continued for about 1 hour at 60°C. To the resulting reaction product was added 260 parts by weight of carbon tetrachloride, and 320 parts by weight of bromine was then gradually added thereto through the dropping funnel at a temperature of 0° to 10°C. The reaction product was washed with 1 percent aqueous sodium bicarbonate solution and water to remove free bromine, after which the reaction product was subjected to reduced pressure at a temperature lower than 80°C to distill off the carbon tetrachloride and water, whereby the compound of No. 1 in Table 1 was obtained in a substantially quantitative yield.

In a similar way, the compounds of Nos. 2, 3, 4, 5, 6, 7, 8, 9, 10 and 11 in Table 1 were synthesized.

METHOD 2

Into a four-necked flask equipped with a stirrer, a thermometer, a dropping funnel and a reflux condenser were charged 58 parts by weight of allyl alcohol and 2.5 parts by weight of a $BF_3$—$Et_2O$ catalyst, into which 570 parts by weight of allyl glycidyl ether was then dropped through the dropping funnel with stirring at a temperature between 40°C and 50°C. Stirring was thereafter continued for about 1 hour at 60°C. 630 parts by weight of carbon tetrachloride was added to the reaction product, into which chlorine gas was then introduced at a temperature of 0° to 10°C until a pre-determined amount was reached. When the generation of heat was stopped, the reaction product was weighed to find that chlorine addition was quantitatively effected and the amount of the reaction product was 1050 parts by weight. The reaction product was then washed with a 1 percent aqueous sodium bicarbonate and water to remove free chlorine, after which the carbon tetrachloride and water were removed at a reduced pressure lower than 20 - 30 mm. Hg at a temperature lower than 80°C to obtain the compound of No. 12 in Table 1 in a substantially quantitative yield.

By a similar procedure, the compound of No. 13 in Table 1 was synthesized.

METHOD 3

Into a four-necked flask equipped with a stirrer, a thermometer, a dropping funnel and a reflux condenser were charged 58 parts by weight of allyl alcohol and 1.8 parts by weight of a $BF_3$—$Et_2O$ catalyst, after which 570 parts by weight of allyl glycidyl ether was dropped thereinto through the dropping funnel with stirring at a temperature between 40°C and 50°C. Stirring was thereafter continued for about 1 hour at 60°C, after which the temperature was lowered to 40°- 50°C, at which 44 parts by weight of an ethylene oxide was gradually introduced in a gaseous state into the flask. When a pre-determined amount of ethylene oxide was introduced, the temperature was slowly elevated to 60°C, at which stirring was continued for about 1 hour. The reaction product was mixed with 630 parts by weight of carbon tetrachloride and the resulting mixture was cooled to a temperature of 0° to 10°C, at which 960 parts by weight of bromine was gradually dropped thereinto through the dropping funnel. The reaction product was washed with a 1 percent aqueous sodium bicarbonate and water to remove free bromine and then subjected to a reduced pressure of 20 - 30 mm. Hg at a temperature of 80°C or less to remove the carbon tetrachloride and water to obtain the compound of No. 14 in Table 1 in a substantially quantitative yield.

In a similar manner, the compounds of Nos. 15 and 16 in Table 1 were synthesized.

METHOD 4

Into a four-necked flask equipped with a stirrer, a thermometer, a dropping funnel and a reflux condenser were charged 58 parts by weight of allyl alcohol and 1.6 parts by weight of a $BF_3$—$Et_2O$ catalyst, after which 456 parts by weight of allyl glycidyl ether was then dropped with stirring into the flask through the dropping funnel at a temperature between 40°C and 50°C. Stirring was thereafter continued for about 1 hour at 60°C, after which the temperature was again lowered to 40°- 50°C, at which 60 parts by weight of ethylene sulfide was dropped into the flask through the dropping funnel. After the completion of dropping, the temperature was again elevated to 60°C, at which stirring was further continued for about 1 hour. 570 parts by weight of carbon tetrachloride was thereafter added to the reaction product and the resulting mixture was cooled to 0° to 10°C, at which 800 parts by weight of bromine was dropped thereinto through the dropping funnel. The resulting reaction product was washed with a 1 percent aqueous sodium bicarbonate and water to remove free bromine, after which the carbon tetrachloride and water were removed at a reduced pressure of 20 - 30 mm. Hg at a temperature lower than 80°C to obtain the compound of No. 18 in Table 1 in a substantially quantitative yield.

In a similar manner, the compounds of Nos. 17, 19, 20, 21 and 22 in Table 1 were synthesized.

METHOD 5

Into a four-necked flask equipped with a stirrer, a thermometer, a dropping funnel and a reflux condenser were charged 79.5 parts by weight of ethylene chlorohydrin and 0.9 parts by weight of a $BF_3$—$Et_2O$ catalyst, after which 342 parts by weight of allyl glycidyl ether was gradually dropped thereinto through the dropping funnel at a temperature between 40°C and 50°C. Stirring was thereafter continued for about 1 hour at 60°C, after which the temperature was lowered to 40° - 50°C, at which 154.5 parts by weight of p-chlorostyrene oxide was dropped into the flask through the dropping funnel. After the completion of dropping p-chlorostyrene oxide, the temperature was elevated to 60°C, at which stirring was continued for about 1 hour. 480 parts by weight of carbon tetrachloride was thereafter added to the reaction product and then the temperature was lowered to 0° to 10°C, at which chlorine gas was gradually introduced into the flask. When the generation of heat was stopped, the reaction product was weighed to find that the chlorine-addition was quantitatively effected and the amount of the product was 786 parts by weight. The reaction product was washed with a 1 percent aqueous sodium bicarbonate and water to remove free chlorine and then subjected to a reduced pressure of 20 - 30 mm. Hg at a temperature of 80° C or lower to distill off the carbon tetrachloride and water, whereby the compound of No. b 23 in Table 1 was substantially quantitatively obtained.

METHOD 6

Into a four-necked flask equipped with a stirrer, a thermometer, a dropping funnel and a reflux condenser were charged 110 parts by weight of thiophenol and 1.8 parts by weight of a $BR_3$—$Et_2O$ catalyst and then 504 parts by weight of glycidyl thiomethacrylate was dropped thereinto through the dropping funnel with stirring at a temperature between 40°C and 50°C, after which stirring was continued at 60°C for about 1 hour. The temperature was lowered to 40° – 50°C, at which 44 parts by weight of an ethylene oxide gas was introduced thereinto in the same manner as in Method 3. 660 parts by weight of carbon tetrachloride was added to the reaction product, and 210 parts of a chlorine gas was added at a temperature of 0° to 10°C in the same manner as Method 2. After the chlorine-addition, the reaction product was washed with a 1 percent aqueous sodium bicarbonate and water to remove free chlorine and then subjected to a reduced pressure of 20 – 30 mm. Hg at 80°C or less to distill off the carbon tetrachloride and water, whereby the compound of No. 24 in Table 1 was substantially quantitatively obtained.

METHOD 7

Into a four-necked flask equipped with a stirrer, a thermometer, a dropping funnel and a reflux condenser were charged 58 parts by weight of allyl alcohol and 1.8 parts by weight of a $BF_3Et_2O$ catalyst, after which 342 parts by weight of allyl glycidyl ether was gradually dropped into the flask through the dropping funnel with stirring at a temperature between 40°C and 50°C. After the completion of dropping allyl glycidyl ether, stirring was continued at 60°C for about 1 hour, and then 44 parts by weight of ethylene oxide gas was added in the same manner as in Method 3. The temperature was lowered to 40° – 50°C, at which 228 parts by weight of allyl glycidyl ether was dropped through the dropping funnel into the flask, after which the temperature was elevated to 60°C and stirring was continued at that temperature for about 1 hour. Bromination was then effected in the same manner as in Method 3 to obtain the compound of No. 25 in Table 1.

METHOD 8

Into a four-necked flask provided with a stirrer, a thermometer, a dropping funnel and a reflux condenser were charged 32 parts by weight of methanol and 0.5 part by weight of a $BF_3$-ether complex catalyst, and 228 parts by weight of allylglycidyl ether was gradually dropped into the flask through the dropping funnel at a reaction temperature of 40° to 50°C while stirring the mixture. After the completion of the dropping, stirring was continued at 60°C for about 1 hr., after which 200 parts by weight of carbon tetrachloride was added to the reaction mixture. At a temperature of 0° to 10°C, 71 parts by weight of chlorine gas was reacted with the mixture. After the completion of the reaction, a 40 percent aqueous solution of 80 parts by weight of sodium hydroxide was dropped into the reaction mixture at a temperature of 40°C or lower. After the completion of the dropping, stirring was continued for 4 hrs. at a temperature of 70° to 80°C. 200 parts by weight of water was added to the reaction product to wash the same and remove the resulting sodium chloride salt. The carbon tetrachloride layer was then cooled to 0°C, after which 320 parts by weight of bromine was dropped into

TABLE 1

| No. | Starting compounds (part by weight) | | | | Catalyst $BF_3$—$Et_2O$ (part by weight) | Solvent $CCl_4$ (part by weight) | Reaction product yield (part by weight) |
|---|---|---|---|---|---|---|---|
| 1 | $CH_3OH$ | 32 | $CH_2CHCH_2OCH_2CH=CH_2$ | 228 Br₂ 320 | 0.5 | 260 | 580 |
| 2 | $ClCH_2CH_2OH$ | 79.5 | Same as above | 456 Br₂ 640 | 1.6 | 530 | 1,175 |
| 3 | $CH_2=CHCH_2OH$ | 58 | do | 342 Br₂ 640 | 1.2 | 400 | 1,035 |
| 4 | Same as above | 58 | $CH_2CHCH_2OOCCH=CH_2$ | 2,540 Br₂ 3,360 | 7.8 | 2,600 | 5,960 |
| 5 | Br—⌬(OH)—Br | 331 | $CH_2CHCH_2OCH_2CH=CH_2$ | 342 Br₂ 480 | 1.0 | 670 | 1,150 |
| 6 | $nC_4H_9OH$ | 73 | Same as above | 798 Br₂ 1,120 | 2.6 | 870 | 1,990 |
| 7 | $CH_3COOH$ | 60 | do | 228 Br₂ 320 | 0.7 | 290 | 605 |
| 8 | $CH_2=CHCH_2OH$ | 58 | do | 570 Br₂ 960 | 1.9 | 630 | 1,583 |
| 9 | Same as above | 58 | do | 3,420 Br₂ 4,980 | 10.4 | 3,480 | 8,430 |
| 10 | $CH_3OH$ | 32 | do | 570 Br₂ 800 | 1.8 | 600 | 1,400 |
| 11 | $CH_2=CHCH_2OH$ | 58 | $CH_2CHCH_2OCH_2CH=CH_2$ | 380 Br₂ 640 | 1.3 | 450 | 1,085 |

TABLE 1—Continued

| No. | Starting compounds (part by weight) | | | | Catalyst BF₃–Et₂O (part by weight) | Solvent CCl₄ (part by weight) | Reaction product yield (part by weight) |
|---|---|---|---|---|---|---|---|
| 12 | Same as above | 68 | $CH_3CHCH_2OCH_2CH=CH_2$ | 570 Cl₂ | 426 | 2.5 | 630 | 1,080 |
| 13 | $CH_2=CHCH_2OH$ | 68 | $CH_3CHCH_2OOCC=CH_2$ with $CH_3$ | 2,135 Cl₂ | 1,136 | 6.6 | 2,200 | 3,324 |
| 14 | Same as above | 58 | $CH_3CHCH_2OOCH_2CH=CH_2$ | 570 Br₂ | 960 $CH_3CH$ (epoxide) | 1.8 | 630 | 1,630 |
| 15 | do | 58 | Same as above | 2,850 Br₂ | 3,360 Same as above | 8.7 | 2,600 | 6,350 |
| 16 | do | 58 | $CH_3CH_2CH_2SCH_2CH=CH_2$ | 520 Br₂ | 800 do | 1.7 | 620 | 2,040 |
| 17 | — | 331 | $CH_3CHCH_2OCH_2CH=CH_2$ | 798 Br₂ | 1,120 $CH_3CH$ (phenyl epoxide) | 3.0 | 1,170 | 2,360 |
| 18 | $CH_2=CHCH_2OH$ | 58 | Same as above | 456 Br₂ | 800 $CH_3CH_2$ (epoxide-S) | 1.6 | 570 | 1,370 |
| 19 | $C_6H_5SH$ | 62 | Same as Example 17 | 2,280 Br₂ | 3,200 $CH_3CHCH_2Br$ (epoxide) | 7.0 | 2,480 | 5,675 |
| 20 | $CH_3OH$ | 46 | $CH_3CH_2CH_2OOCC=CH$ with $CH_3$ | 390 Br₂ | 480 $CH_3CHCH_2Cl$ (epoxide-S) | 1.3 | 560 | 1,040 |
| 21 | Same as above | 56 | $CH_3CHCH_2SOCC=CH_2$ with $CH_3$ | 504 Br₂ | 480 $CH_3CHCH_2Cl$ (epoxide-S) | 1.6 | 642.5 | 1,122 |
| 22 | $CH_3COOH$ | 48 | $CH_3CHCH_2OCH_2CH=CH_2$ | 570 Br₂ | 800 $CH_3CHCH_3$ (epoxide) | 1.8 | 680 | 1,473 |
| 23 | $ClCH_2CH_2OH$ | 79.5 | Same as above | 342 Cl₂ | 210 (Cl-phenyl epoxide) | 0.9 | 480 | 786 |
| 24 | $C_6H_5SH$ | 110 | $CH_3CHCH_2SOCC=CH_2$ with $CH_3$ | 504 Cl₂ | 210 $CH_3CH_2$ (epoxide) | 1.8 | 660 | 864 |
| 25 | $CH_2=CHCH_2OH$ | 58 | $CH_3CHCH_2OCH_2CH=CH_2$ | 570 Br₂ | 960 Same as above | 1.8 | 630 | 1,629 |

TABLE 1—Continued

| No. | Elementary analysis of reaction product ( ) refers to calculated value | | | | Structural formula of reaction product according to Formula I | | | | | | | |
|---|---|---|---|---|---|---|---|---|---|---|---|---|
| | C | Br | Cl | S | A | R | X | $Y_1$ | $Y_2$ | $Y_3$ | m | n |
| 1 | 26.9(26.89) | 55.2(55.17) | | | $CH_3O—$ | $CH_2BrCHBrCH_2—$ | | O | | O | 2 | 0 |
| 2 | 26.5(26.52) | 54.4(54.40) | 3.0(3.02) | | $ClCH_2CH_2O—$ | Same as above | | O | | O | 4 | 0 |
| 3 | 24.2(24.23) | 61.5(61.64) | | | Same as above | do | | O | | O | 3 | 0 |
| 4 | 24.7(24.68) | 56.2(56.20) | | | Same as above | do | | O | | O | 20 | 0 |
| 5 | 16.2(16.17) | 61.9(61.90) | | | ![Br-phenyl-Br structure] | $CH_2BrCHBrCH_2—$ | | O | | O | 3 | 0 |
| 6 | 27.7(27.71) | 56.2(66.22) | | | $C_6H_5O—$ | do | | O | | O | 7 | 0 |
| 7 | 27.5(27.54) | 52.5(52.46) | | | $CH_3COO—$ | do | | O | | O | 2 | 0 |
| 8 | 24.9(24.94) | 60.5(60.45) | | | $CH_2BrCHBrCH_2O—$ | do | | O | | O | 5 | 0 |
| 9 | 25.0(25.06) | 57.5(57.64) | | | Same as above | do | | O | | O | 30 | 0 |
| 10 | 27.1(27.03) | 58.0(58.06) | | | $CH_3O—$ | do | | O | | O | 5 | 0 |
| 11 | 23.2(23.16) | 59.0(58.82) | | | $CH_3O—$ | do | | O | | O | 5 | 0 |
| 12 | 37.6(37.57) | | | 8.3(8.24) | $CH_3ClCHClCH_2O—$ | $ClCH_2CHClCH_2—$ | | S | | O | | 0 |
| 13 | 40.8(40.83) | | 40.4(40.42) | | $CH_2ClCHClCH_2—$ | $CH_3$<br>$CH_2Cl—C—CO—$<br>$Cl$ | | O | | O | 15 | 0 |
| 14 | 25.7(27.77) | 58.9(58.82) | | | $CH_2BrCHBrCH_2O—$ | $CH_2BrCHBrCH_2—$ | —H | O | S | O | 5 | 1 |
| 15 | 26.4(26.13) | 58.0(57.91) | | 2.0(2.03) | Same as above | Same as above | —H | O | S | O | 25 | 2 |
| 16 | 25.0(25.04) | 58.2(58.22) | | | $C_2H_5S—$ | do | | O | S | O | 4 | 1 |
| 17 | 25.4(26.41) | 57.3(57.50) | | 2.3(2.33) | do | $CH_2BrCHBrCH_2$ | ![phenyl] | O | O | O | 7 | 1 |
| 18 | 25.0(25.04) | 57.6(57.53) | | | | do | —H | O | O | O | 4 | 1 |
| 19 | 26.3(26.26) | 58.0(57.91) | | 2.0(2.03) | $CH_2BrCHBrCH_2S—$ | do | —$CH_2Br$ | O | S | O | 20 | 2 |
| 20 | 29.8(29.87) | 45.9(45.96) | 3.4(3.40) | 3.0(3.06) | $C_2H_5O—$ | $CH_3$<br>$CH_2Br—C—CO—$<br>$Br$ | —$CH_2Cl$ | O | O | O | 3 | 1 |
| 21 | 30.0(30.00) | 46.0(46.13) | 3.4(3.41) | | $CH_3O—$ | Same as above | —$CH_3Cl$ | O | O | O | 3 | 1 |
| 22 | 28.5(28.46) | 54.1(54.20) | | 8.2(8.23) | $CH_3COO—$ | $CH_2BrCHBrCH_2—$ | —$CH_3$ | O | O | O | 5 | 1 |
| 23 | 42.5(42.53) | | 35.9(35.95) | | $ClCH_2CH_2O—$ | $CH_2BrCHBrCH_2—$ | ![Cl-phenyl] | O | O | O | 3 | 1 |
| 24 | 31.3(31.41) | | 19.2(19.22) | 11.6(11.55) | ![S-phenyl] | $CH_3$<br>$CH_2Cl—C—CO—$<br>$Cl$ | —H | O | O | O | 3 | 1 |
| 25 | 25.8(25.77) | 58.8(58.82) | | | $CH_2BrCHBrCH_2O—$ | $CH_2BrCHBrCH_2—$ | —H | O | O | O | 5 | 1 | the layer and reacted with the reaction product at a temperature of 0° to 10°C. After the completion of the reaction, the product was washed with a 1 percent aqueous ammonium bicarbonate solution and then water to remove free bromine. The carbon tetrachloride and the water were distilled off at a temperature of 80°C or lower under a reduced pressure to obtain substantially quantitatively a compound having the following structure:

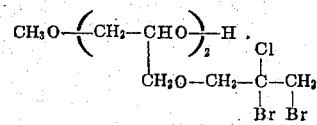

The elementary analysis of the product was as follows:

Found (%): C 23.98; Br 49.39; Cl 10.20
Calcd.(%): C 24.04; Br 49.31; Cl 10.94

METHOD 9

Into a four-necked flask provided with a stirrer, a thermometer, a dropping funnel and a reflux-condenser were charged 58 parts by weight of allyl alcohol and 2.5 parts by weight of a BF$_3$-ether complex catalyst, and 570 parts by weight of allyglycidyl ether was gradually dropped into the flask through the dropping funnel at a temperature of 40° to 50°C while stirring the mixture, after which stirring was continued at 60°C for about 1 hr. To the reaction product was added 630 parts by weight of carbon tetrachloride, and to the resulting mixture was dropwise added through the dropping funnel 960 parts by weight of bromine at a temperature of 0° to 10°C. The acid value of the reaction product was determined and a 40 percent aqueous sodium hydroxide solution added thereto in an amount corresponding to the acid value to neutralize the product, after which a 40 percent aqueous solution of 240 parts by weight of sodium hydroxide was dropped into the neutralized product at a temperature of 40°C or lower with stirring. After the completion of the addition of the sodium hydroxide solution, the resulting mixture was stirred at a temperature of 70° to 75°C for 3 hours. The reaction mixture was then cooled to 0°C, after which 960 parts by weight of bromine was added thereto at a temperature of 0° to 10°C to effect reaction. After the completion of the reaction, the reaction product was washed with a 1 percent aqueous ammonium bicarbonate solution and then water to remove free bromine. The carbon tetrachloride and the water were distilled off at a temperature of 80°C or lower under a reduced pressure to obtain substantially quantitatively a compound having the structure,

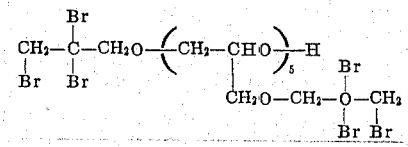

The elementary analysis of the product was as follows:

Found (%): C 19.11; Br 70.01
Calcd.(%): C 19.20; Br 69.84

The present invention is further explained by the following Examples which are only by way of illustration and not by way of limitation.

Example 1

100 parts by weight of a styrene polymer having a number average molecular weight of 160,000 was separately mixed with the present flame-retarding agents and conventional flame-retarding agents as shown in Table 2 in amounts as shown in Table 2, the resulting respective mixtures were kneaded on hot rollers at 140° – 150°C for 5 minutes. The thus kneaded mixtures were pressed at a pressure of 150 atms. at 140° – 160°C for 3 minutes, and then subjected to a cooling screw press. According to ASTM-D635-56T, the non-foamed polystyrene sheets withdrawn from the cooling screw press were cut to obtain test samples of 127 × 12.7 × 1.5 mm which were then subjected to burning test. Further, a sample prepared by the same method as above, except that no flame-retarding agent was used, was subjected to the same burning test. The results obtained are as shown in Table 2.

TABLE 2

TABLE 2—Continued

| The present flame-retarding agent | | | | | | | | Conventional flame-retarder | | | Burning rate (cm./min.) |
|---|---|---|---|---|---|---|---|---|---|---|---|
| A | R | X | Y₁ | Y₂ | Y₃ | m | n | Amt. (pt.) | Name | Amt. (pt.) | Estimation | |
| Same as above | Same as above | | O | | O | 3 | 0 | 4 | Antimony trioxide. | 0.8 | ...do... | 0.0 |
| Do | do | | O | | O | 3 | 0 | 4 | Tris(2,3-dibromopropyl) phosphate. | 0.8 | ...do... | 0.0 |
| Do | do | | O | | O | 3 | 0 | 5 | Bis (2-chloroethyl) vinyl phosphonate. | 1.0 | ...do... | 0.0 |
| Do | do | | O | | O | 3 | 0 | 4 | Tetrabromobutane. | 1.2 | ...do... | 0.0 |
| Do | do | | O | | O | 3 | 0 | 4 | Tetrabromoethane. | 1.2 | ...do... | 0.0 |
| Free from flame-retarding agent | | | | | | | | | | | Burnt | 16.0 |

Example 2

In a beaker, 100 parts by weight of polystyrene particles number average molecular weight: 180,000, each containing propane gas pressurized thereinto, were mixed with a flame-retarding agent as shown in Table 3 in an amount as shown in Table 3 at room temperature to uniformly coat the particles with the agent. The thus coated polystyrene particles were pre-expanded by subjecting them to steam at 100°C for 10 minutes. The thus pre-expanded particles were allowed to stand at room temperature for at least 5 hours, thereafter placed in a mold and heated therein with superheated steam at a pressure of 1.0 atm. (gauge) for 90 seconds, after which the mold is cooled to room temperature to obtain a foamed polystyrene shaped particle. The thus obtained article was subjected to a burning test according to Japan Industrial Standards A-9511-1965. The results obtained are as shown in Table 3.

As is clear from the results shown in Table 3, the present flame-retarding agents are superior in not only flame-retarding property but also resistance to weather and blocking, though the compound having the formula (I) in which $Y_1$, $Y_2$ and $Y_3$ are oxygen, m is 1 and n is 0 is somewhat inferior in resistance to weather and blocking to the other compounds of the present invention.

Further, when a sample free from any flame-retarding agent was subjected to a burning test under the same conditions, the sample began to burn immediately upon contacting with the flame source and was burnt up in 18.1 seconds.

Note 1.

The compound of No. 23 has random-copolymeric segments and is represented by the following formula:

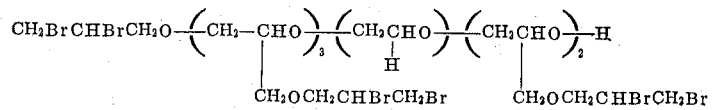

Note 2.

When the polystyrene composition of the present invention is contacted with a flame source, polystyrene itself is burnt, but upon removing the flame source, the flaming polystyrene is extinguished by the action of the flame-retarding agent contained in the composition.

The term "self-extinguished" used herein refers to the case where when the flame source is removed from the polystyrene, there is a significant burning time between the removal of the flame source and extinguishment, and the term "not burnt" used herein refers to the case where upon removing the flame source from the polystyrene composition, the flaming polystyrene is immediately extinguished, i.e., there is substantially no time between the removal of the flame source and extinguishment. In general, when the self-extinguishing time is within 3 sec., the flame-retarding agent is satisfactory as commercial product.

Note 3.

The weather-resistance was tested by exposing the samples directly to the sun for 10 days and observing the state of the samples with the naked eye comparing them with a sample free from flame-retarding agent.

Note 4.

Blocking property: After pre-expansion, particles adhered to other particles were separated from non-adhered particles, and the weight of the separated particles was determined. The blocking property is expressed by the percentage of the weight of the separated particles based on the total weight of the particles. 0 percent is the best.

Note 5.

The expansion rate of expandable polystyrene particles free from flame-retarding agent was 55 times or more.

Note 6.

The compounds of Nos. 27, 28 and 29 are the conventional flame-retarding agents.

Note 7.

Extent of shrinkage refers to the result of comparison with the article free from flame-retarding agent.

Note 8.

The compounds of Nos. 25 and 26 contain at least one tri-halogenated propyl group.

Example 3

Using the flame-retarding agents of Nos. 5, 9, 13, 14, 20 and 21 in Table 3 and conventional flame-retarding agents, such as halogenated hydrocarbons, phosphates, metal oxides and the like as shown in Table 4 in amounts as shown in Table 4, polystyrene particles (number average molecular weight: 180,000), each containing propane gas pressurized thereinto, were treated in the same manner as in Example 2 to obtain foamed polystyrene shaped articles which were then subjected to burning test and weather resistance test in the same manner as in Example 2. The results obtained are as shown in Table 4, from which it can be seen that the present flame-retarding agent is superior in flame-retarding property and weather-resistance even when used along with conventional flame-retarding agents.

TABLE 3

| No. | Flame-retarding agent A | R | X | $Y_1$ | $Y_2$ | $Y_3$ | m | n | Amount (part by weight) | Burning test Burning time (sec.) | Burning test Estimate | Weather-resistance test | Blocking (percent) | Extent of shrinkage |
|---|---|---|---|---|---|---|---|---|---|---|---|---|---|---|
| 1 | $CH_3O-$ | $CH_2BrCHBrCH_2-$ | | 0 | | | 2 | 0 | 1.0 | 0.4 | Self-extinguished | Somewhat colored on 6th day | 0.5 | No change |
| 2 | $C_2H_5O-$ | Same as above | | 0 | | | 7 | 0 | 2.5 | 0.3 | do | Somewhat colored on 8th day | 0.0 | Do. |
| 3 | $ClCH_2CH_2O-$ | do | | 0 | | | 4 | 0 | 4.0 | 0.3 | do | Somewhat colored on 6th day | 0.0 | Do. |
| 4 | $CH_3COO-$ | do | | 0 | | | 2 | 0 | 4.0 | 0.5 | do | do | 0.2 | Do. |
| 5 | $CH_2BrCHBrCH_2O-$ | do | | 0 | | | 3 | 0 | 4.0 | 0.0 | Not burnt | Somewhat colored on 7th day | 0.0 | Do. |
| 6 | $CH_2BrCHBrCH_2O-$ | $ClCH_2CHClCH_2-$ | | 0 | | | 5 | 0 | 2.0 | 0.0 | do | Somewhat colored on 8th day | 0.0 | Do. |
| 7 | $CH_2BrCHBrCH_2O-$ | $CH_2BrCHBrCO-$ | | 0 | | | 20 | 0 | 3.0 | 0.0 | do | No change | 0.0 | Do. |
| 8 | $CH_3ClCHClCH_2O-$ | $CH_2Cl-\overset{CH_3}{\underset{Cl}{C}}-CO-$ | | 0 | | | 15 | 0 | 3.5 | 0.0 | do | do | 0.0 | Do. |
| 9 | $CH_2BrCHBrCH_2O-$ | $CH_2BrCHBrCH_2-$ | | 0 | | | 5 | 0 | 3.0 | 0.0 | do | Somewhat colored on 8th day | 0.0 | Do. |
| 10 | ![Br-phenoxy-Br with Br] | Same as above | | 0 | | | 3 | 0 | 4.5 | 0.0 | do | do | 0.0 | Do. |
| 11 | $CH_2BrCHBrCH_2O-$ | do | | 0 | 0 | 0 | 20 | 0 | 3.0 | 0.0 | do | No change | 0.0 | Do. |
| 12 | $CH_3O-$ | do | $-H$ | 0 | 0 | 0 | 5 | 0 | 4.0 | 0.0 | do | Colored on 7th day | 0.0 | Do. |
| 13 | $CH_2BrCHBrCH_2O-$ | Same as above | $-H$ | 0 | 8 | 0 | 4 | 1 | 2.0 | 0.0 | do | No change | 0.0 | Do. |
| 14 | Same as above | do | $-CH_2Br$ | 0 | 0 | 0 | 20 | 2 | 2.5 | 0.0 | do | Somewhat colored on 9th day | 0.0 | Do. |
| 15 | $C_3H_7O-$ | do | | 0 | 0 | 0 | | | | | | No change | | |
| 16 | $ClCH_2CH_2O-$ | $CH_2ClCHClCH_2-$ | ![Cl-phenyl] | 0 | 0 | 0 | 3 | 1 | 4.5 | 2.7 | Self-extinguished | do | 0.3 | Do. |
| 17 | ![Br-phenoxy-Br with Br] | $CH_2BrCHBrCH_2-$ | ![phenyl] | 0 | 0 | 0 | 7 | 1 | 3.0 | 0.2 | do | Somewhat colored on 6th day | 0.0 | A little shrunk |

TABLE 3—Continued

| No. | Flame-retarding agent R | X | Y₁ | Y₂ | Y₃ | m | n | Amount (part by weight) | Burning test Burning time (sec.) | Estimate | Weather-resistance test | Blocking (percent) | Extent of shrinkage |
|---|---|---|---|---|---|---|---|---|---|---|---|---|---|
| 18 | CH₂BrCHBrCH₂O— | Same as above | | 8 | 0 | | 3 | 0 | 2.5 | 0.0 | Not burnt | Somewhat colored on 7th day | 0.02 | Do. |
| 19 | 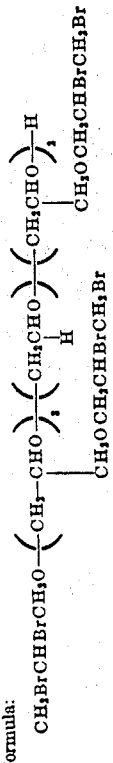 | CH₃<br>CH₂Cl—C—CO<br>Cl | —H | 0 | 0 | 8 | 2 | 1 | 3.5 | 2.3 | Self-extinguished | No change | 0.0 | Do. |
| 20 | C₂H₅O— | CH₃<br>CH₂Br—C—CO—<br>Br | —CH₂Cl | 0 | 0 | 8 | 3 | 1 | 2.5 | 0.7 | do | do | 0.0 | Do. |
| 21 | CH₂BrCHBrCH₂O— | CH₂BrCHBrCH₂— | —H | 0 | 0 | | 25 | 2 | 2.0 | 0.00 | Not burnt | No change | 0.0 | A little shrunk. |
| 22 | CH₃COO— | Same as above | —CH₃ | 0 | 0 | | 5 | 1 | 2.5 | 0.3 | Self-extinguished | do | 0.0 | Do. |
| 23 | CH₂BrCHBrCH₂O— | do | —H | 0 | 0 | | 5 | 1 | 2.0 | 0.0 | Not burnt | do | 0.0 | Do. |
| 24 | Same as above | do | | 0 | 0 | | 1 | 0 | 4.0 | 2.8 | Self-extinguished | Color on 2nd day | 16.8 | Somewhat shrunk. |
| 25 | do | CH₂BrCBr₂CH₂— | | 0 | 0 | | 3 | 0 | 1.5 | 0.0 | Not burnt | Somewhat colored on 6th day | 0.5 | No change. |
| 26 | Same as above | CH₂BrCHBrCO— | | 0 | 0 | | 20 | 0 | 4.0 | 0.0 | do | No change | 0.0 | Do. |
| 27 | Glycerol tris(2,3-dibromopropyl) ether | | | | | | | | 4.0 | 2.0 | Self-extinguished | Colored on 2nd day | 17.2 | Somewhat shrunk. |
| 28 | Di(2,3-dibromopropyl)ether | | | | | | | | 3.0 | 2.5 | do | do | 20.5 | Extremely shrunk. |
| 29 | Tris(2,3-dibromopropyl) phosphate | | | | | | | | 3.0 | 2.0 | do | Colored on 5th day | 23.2 | Do. |

Note 1. The compound of No. 23 has random-copolymeric segments and is represented by the following formula:

$$CH_2BrCHBrCH_2O{-}(CH_2{-}CHO)_x{-}(CH_2CHO)_y{-}(CH_2CHO)_z{-}H$$
$$CH_2OCH_2CHBrCH_2Br \quad H \quad CH_2OCH_2CHBrCH_2Br$$

Note 2. When the polystyrene composition of the present invention is contacted with a flame source, polystyrene itself is burnt, but upon removing the flame source, the flaming polystyrene is extinguished by the action of the flame-retarding agent contained in the composition. The term "self-extinguished" used herein refers to the case where when the flame source is removed from the polystyrene, there is a significant burning time between the removal of the flame source and extinguishment, and the term "not burnt" used herein refers to the case where upon removing the flame source from the polystyrene composition, the flaming polystyrene is immediately extinguished, i.e. there is substantially no time between the removal of the flame source and extinguishment. In general, when the self-extinguishing time is within 3 sec., the flame-retarding agent is satisfactory as commercial product.

Note 3. The weather-resistance was tested by exposing the samples directly to the sun for 10 days and observing the state of the samples with the naked eye comparing them with a sample free from flame-retarding agent.

Note 4. Blocking property: After pre-expansion, particles adhered to other particles were separated from non-adhered particles, and the weight of the separated particles was determined. The blocking property is expressed by the percentage of the weight of the separated particles based on the total weight of the particles. 0% is the best.

Note 5. The expansion rate of expandable polystyrene particles free from flame-retarding agent was 55 times or more.

Note 6. The compounds of Nos. 27, 28, and 29 are the conventional flame-retarding agents.

Note 7. Extent of shrinkage refers to the result of comparison with the article free from flame-retarding agent.

Note 8. The compounds of Nos. 25 and 26 contain at least one tri-halogenated propyl group.

Table 4

| Flame-retarding agent | | Weight ratio of I/II | Total amount of agents* (Part by weight) | Burning test | | Weather resistance** |
|---|---|---|---|---|---|---|
| No. of present one (I) | Conventional one (II) | | | Burning time (sec.) | Estimate | |
| 5 | Antimony oxide | 8/2 | 4 | 0.0 | Not burnt | Good |
| 13 | do. | do. | 2.5 | do. | do. | do. |
| 5 | Tetrabromo-butane | do. | 4 | do. | do. | Slightly colored |
| 14 | do. | do. | 2.5 | do. | do. | do. |
| 9 | Tetrachloro-ethane | do. | 4 | do. | do. | do. |
| 14 | do. | do. | 2.5 | 1.3 | Self-extinguished | do. |
| 5 | Tris(2,3-dibromo-propyl)phosphate | 7/3 | 4 | 0.0 | Not burnt | Good |
| 14 | do. | do. | 2.5 | 0.5 | Self-extinguished | do. |
| 5 | Tris(2-chloroethyl) phosphite | do. | 4 | 0.5 | do. | do. |
| 20 | do. | do. | 2.5 | 1.0 | do. | do. |
| 9 | Bis(2-chloroethyl) vinyl phosphonate | do. | 4 | 0.7 | do. | do. |
| 21 | do. | do. | 2.5 | 0.0 | Not burnt | do. |

Note: *Per 100 parts by weight of propane gas-pressurized polystyrene particles
**Samples were exposed directly to the sun for 7 days and then observed with the naked eye comparing them with control.

Example 4

Into a 10-l. autoclave were charged 3 kg. of a 1 percent aqueous polyvinyl alcohol solution and 2 kg. of polystyrene particles (number average molecular weight: 150,000) and then a mixture of 80 g. of the compound of No. 5 or 13 in Table 3 and 1 g. of Noigen EA120 (non-ionic surface active agent made by Daiichi Kogyo Seiyaku Kabushiki Kaisha in Japan) was charged thereinto, after which a propane gas was introduced with stirring into the autoclave under a pressure of 14 kg./cm$^2$ for 8 hours. The pressure was thereafter reduced to normal pressure, and the particles were withdrawn from the autoclave, washed with water and then dried at room temperature. In the same manner as in Example 2, foamed polystyrene shaped articles were obtained and then subjected to burning test and weather-resistance test to find that with both the compounds of Nos. 5 and 13 in Table 3, the burning time was 0.3 second and the articles were self-extinguished and had good weatherresistance.

This Example shows that even when a flame-retarding agent is added prior to the addition of a foaming agent, a good result is obtained.

Example 5

Into a solution containing 20,000 parts by weight of water, 40 parts by weight of protective colloid (a copolymer of 95 parts by weight of N-vinyl pyrrolidone and 5 parts by weight of methyl acrylate), 20 parts by weight of sodium pyrophosphate, 35 parts by weight of benzoyl peroxide and 20 parts by weight of di-tert.-butyl peroxide, were suspended 10,000 parts by weight of styrene, 300 parts by weight of the compound of No. 9 or 13 in Table 3 and 100 parts by weight of acrylonitrile in an autoclave having a stirrer. The resulting suspension was heated at 70°C for 20 hours and then at 85°C for 15 hours to effect polymerization. After heating a 70°C for 8 hours, 800 parts by weight of pentane was introduced into the autoclave under pressure, 8 hours after which nitrogen was introduced into the autoclave under pressure until the pressure of the autoclave reached 5 atms. (gauge). The polymerization was completed in 35 hours in total. The autoclave was cooled to 30°C, and the produced polymer was washed and then dried. A propane gas was pressurized into the thus produced styrene-acrylonitrile copolymer particles, and expansion was effected in the same manner as in Example 2 to obtain shaped articles, which were then subjected to a burning test and a weather-resistance test to find that with each of the compounds of Nos. 9 and 13, the burning time was 0.0 second, i.e., not burnt and each of the samples had good weather-resistance. This result clearly shows that even when the flame-retarding agent is added prior to polymerization of styrene, a good result is obtained.

Example 6

Using the compounds of Nos. 5, 13 and 14 in Table 3 and the following materials in amounts as shown below, shaped articles were obtained by the same procedure as in Example 5 and subjected to the same test:

|  | Example 6-1 | Example 6-2 | Example 6-3 |
|---|---|---|---|
| Present flame-retarder (parts by weight) | (5) 500 | (13) 400 | (14) 500 |
| Water (parts by weight) | 20,000 | 20,000 | 20,000 |
| Protective colloid (Copolymer of 95 parts by weight of N-vinyl pyrrolidone and 5 parts by weight of methyl acrylate)(parts by weight) | 40 | 40 | 40 |
| Sodium pyrophosphate (parts by weight) | 20 | 20 | 20 |
| Benzoyl peroxide (parts by weight) | 35 | 35 | 35 |
| Di-tert.-butyl | 20 | 20 | 20 |

|  | Example 6-1 | Example 6-2 | Example 6-3 |
|---|---|---|---|
| peroxide (parts by weight) | | | |
| Styrene (parts by weight) | 7,070 | 8,080 | 5,050 |
| Acrylonitrile (parts by weight) | 3,030 | 2,020 | 5,050 |
| Pentane (parts by weight) | 800 | 800 | 800 |
| Test results: | | | |
|  | Example 6-1 | Example 6-2 | Example 6-3 |
| Burning time (sec.) | 0.0 | 0.4 | 0.0 |
| Estimate | Not burnt | Self-extinguished | Not burnt |
| Weather-resistance | Good | Good | Good |

Example 7

7,070 parts by weight of styrene, 3,030 parts by weight of acrylonitrile and 500 parts of the compound of No. 5 in Table 3 were suspended in a solution containing 20,000 parts by weight of water, 40 parts by weight of a protective colloid (copolymer of 95 parts by weight of N-vinyl pyrrolidone and 5 parts by weight of methyl acrylate), 20 parts by weight of sodium pyrophosphate, 35 parts by weight of benzoyl peroxide and 20 parts by weight of di-tert.-butyl peroxide in an autoclave having a stirrer. The resulting suspension was heated while being stirred at 70°C for 20 hours and then at 85°C for 15 hours to effect polymerization. The autoclave was cooled to 30°C, and the resulting polymer was washed and dried. The produced copolymer of acrylonitrile and styrene was mixed with a foaming agent in the following amount, and the resulting mixture was extruded through a small extruder having a screw of 40 mm. diameter and a ratio of length of diameter of 25 to form a foamed shaped article, which was then subjected to the same test as in Example 2. The results obtained are as follows:

|  | Example 7-1 | Example 7-2 |
|---|---|---|
| Acrylonitrile-styrene copolymer (parts by weight) | 100 | 100 |
| Resin added (parts by weight) | — | 30 |
| Foaming agent (parts by weight) | Azohexahydrobenzonitrile 2 | Benzene sulfonyl hydrazine 3 |
| Extruding temperature | 150°C | 150°C |
| Burning test | 0.3 sec., self-extinguished | 0.5 sec., self-extinguished |
| Weather-resistance | Good | Good |

Example 8

Using the same extruder as in Example 7, 100 parts by weight of an ABS resin (acrylonitrile 30 parts by weight, butadiene 30 parts by weight and styrene 40 parts), 3 parts by weight of the compound of No. 5 or 14 in Table 3 and 3 parts by weight of benzene sulfonyl hydrazine as a foaming agent were mixed and extruded at 150°C to form a foamed shaped article, which is then subjected to the same test as in Example 2. The results obtained are as follows:

|  | Burning Time | Estimate | Weather Resistance |
|---|---|---|---|
| Compound of No. 5 | 0.0 sec. | Not burnt | Good |
| Compound of No. 14 | 0.4 sec. | Self-extinguished | Good |
| Free from flame-retarder | 43.0 sec. | Burnt | Good |

We claim:

1. A halogenated compound represented by the formula:

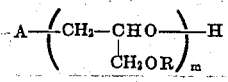

wherein A is selected from the group consisting of $CH_2BrCHBrCH_2O-$ and $CH_2ClCHClCH_2O-$; R is independently selected from the group consisting of $CH_2BrCHBrCH_2-$ and $ClCH_2CHClCH_2-$; and m is 2 to 100.

2. A halogenated compound according to claim 1 represented by the formula:

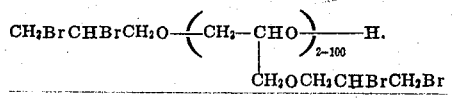

3. A halogenated compound according to claim 1 represented by the formula:

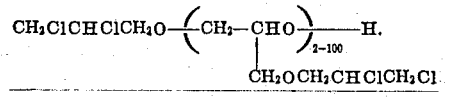

4. A halogenated compound as claimed in claim 1 wherein A is $CH_2BrCHBrCH_2O-$, R is $CH_2BrCHBrCH_2-$, and m is 3.

5. A halogenated compound as claimed in claim 1 wherein A is $CH_2BrCHBrCH_2O-$, R is $CH_2BrCHBrCH_2-$, and m is 5.

6. A halogenated compound as claimed in claim 1 wherein A is $CH_2ClCHClCH_2O-$, R is $ClCH_2CHClCH_2-$ and m is 5.

* * * * *